United States Patent
Hong et al.

(10) Patent No.: US 10,215,274 B2
(45) Date of Patent: Feb. 26, 2019

(54) VEHICLE INCLUDING TRANSMISSION APPARATUS

(71) Applicants: Hyundai Motor Company, Seoul (KR); Kia Motors Corporation, Seoul (KR)

(72) Inventors: Gi Beom Hong, Gyeonggi-do (KR); Seunghyun Woo, Seoul (KR); Daeyun An, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/802,620

(22) Filed: Nov. 3, 2017

(65) Prior Publication Data
US 2019/0024785 A1    Jan. 24, 2019

(30) Foreign Application Priority Data
Jul. 24, 2017  (KR) .......................... 10-2017-0093459

(51) Int. Cl.
| | |
|---|---|
| *B60K 20/00* | (2006.01) |
| *G05G 9/00* | (2006.01) |
| *F16H 61/18* | (2006.01) |
| *F16H 61/22* | (2006.01) |
| *F16H 59/02* | (2006.01) |
| *F16H 61/32* | (2006.01) |

(52) U.S. Cl.
CPC .......... *F16H 61/18* (2013.01); *F16H 59/0204* (2013.01); *F16H 61/22* (2013.01); *F16H 2061/326* (2013.01)

(58) Field of Classification Search
CPC ............ F16H 59/0204; F16H 59/0278; F16H 2059/0221
See application file for complete search history.

(56) References Cited

U.S. PATENT DOCUMENTS

| | | | |
|---|---|---|---|
| 6,151,977 A * | 11/2000 | Menig .................... | B60K 20/06 74/336 R |
| 6,945,349 B2 * | 9/2005 | Colling .................. | B60K 20/06 180/333 |
| 2003/0000763 A1 * | 1/2003 | Colling .................. | B60K 20/06 180/333 |

(Continued)

FOREIGN PATENT DOCUMENTS

| | | |
|---|---|---|
| JP | 2009-073375 A | 4/2009 |
| KR | 10-1421957 | 7/2014 |

(Continued)

*Primary Examiner* — Jake Cook
(74) *Attorney, Agent, or Firm* — Mintz Levin Cohn Ferris Glovsky and Popeo, P.C.; Peter F. Corless

(57) ABSTRACT

A vehicle is provided with a shift lever and a transmission apparatus. The transmission apparatus separates a manual shift lever from an automatic shift lever to distinguish manual shifting from automatic shifting, thereby preventing an erroneous user operation. The shift lever receives a shift command and the transmission apparatus performs shifting according to the shift command received by the shift lever. The shift lever includes an automatic shift lever that moves linearly to receive an automatic shift command and a manual shift lever that rotates on the automatic shift lever as an axis of rotation to receive a manual shift command.

12 Claims, 10 Drawing Sheets

(56) References Cited

U.S. PATENT DOCUMENTS

2004/0163924 A1    8/2004   Wendeberg et al.
2008/0184841 A1*   8/2008   Blind .................... A01B 63/00
                                                        74/491

FOREIGN PATENT DOCUMENTS

KR         10-1585473        1/2016
KR     10-2016-0088566       7/2016

* cited by examiner

VEHICLE INCLUDING TRANSMISSION APPARATUS

CROSS-REFERENCE TO RELATED APPLICATION

This application claims the benefit of Korean Patent Application No. 10-2017-0093459, filed on Jul. 24, 2017 in the Korean Intellectual Property Office, the disclosure of which is incorporated herein by reference.

BACKGROUND

1. Field of Disclosure

The present disclosure relates to a vehicle, and more particularly, to a vehicle that has a transmission apparatus for performing automatic shifting by slide operation and performing manual shifting by rotation operation.

2. Description of the Related Art

In general, a transmission is an apparatus that changes power generated by an engine to torque and speed to be suitable for a driving state of a vehicle, and transfers the torque and speed to driving wheels. The transmission is classified to as automatic transmission and a manual transmission. A driver who operates a vehicle manipulates a shift lever mounted on a console surface around a driver seat or on a handle to change a shift stage of a manual transmission or an automatic transmission to a desired shift stage.

For the manual transmission, when a driver selects a gear suitable for a driving state of a vehicle using a shift lever, the desired motion is transferred to the transmission via a cable or a rod. For the automatic transmission, when a driver moves a shift lever, an inhibitor switch is driven by a cable to transfer the desired motion to the transmission.

Recently, many vehicles have been adapted to use a shift-by-wire (SBW)-type shift lever. The SBW-type shift lever receives a shift command via various manipulation methods, unlike typical mechanical shift levers. The SBW-type shift lever has no mechanical cable connection structure, unlike the mechanical shift levers, and is satisfactory in view of operating force and handling feeling to be manipulated more easily. The types of the SBW-type shift lever include a lever-type shift lever that protrudes on a console surface of a vehicle to move forward or backward, a dial-type shift lever that has a column shape mounted on a console surface of a vehicle to rotate in left and right directions, a column-type shift lever mounted on one side of a handle of a vehicle to move vertically, and a button-type shift lever that has buttons representing shift stages of a vehicle to operate when one of the buttons is pressed.

SUMMARY

Therefore an aspect of the present disclosure provides a vehicle including a transmission apparatus of separating a manual shift lever from an automatic shift lever to distinguish manual shifting from automatic shifting, thereby preventing an erroneous user operation. Another aspect of the present disclosure provides a vehicle including a transmission apparatus of performing automatic shifting by slide operation and performing manual shifting by rotation operation to distinguish manual shifting from automatic shifting, thereby preventing an erroneous user operation. Additional aspects of the disclosure will be set forth in part in the description which follows and, in part, will be obvious from the description, or may be learned by practice of the disclosure.

In accordance with one aspect of the present disclosure, a vehicle may include a shift lever configured to receive a shift command and a transmission apparatus configured to perform shifting based on the shift command received by the shift lever. In particular, the shift lever may include an automatic shift lever configured to move linearly to receive an automatic shift command and a manual shift lever configured to rotate on the automatic shift lever as an axis of rotation to receive a manual shift command.

The automatic shift lever may be positioned at any one shift stage of park (P), reverse (R), neutral (N), and drive (D) shift stages, and may be configured to receive the automatic shift command based on a position of the automatic shift lever. The manual shift lever may be rotatable in a first direction or in a second direction that is opposite to the first direction. When the manual shift lever rotates to a predetermined angle in the first direction, the manual shift lever may be configured to receive a shift-down (−) command, and when the manual shift lever rotates to a predetermined angle in the second direction, the manual shift lever may be configured to receive a shift-up (+) command.

When the automatic shift lever is positioned at the D shift stage, the manual shift lever may be allowed to rotate, and when the automatic shift lever is positioned at any one shift stage of the P, R, and N shift stages, the manual shift lever may be prevented from rotating. The shift lever may further include a connection portion that connects the automatic shift lever to the manual shift lever, and the connection portion may be rotatably coupled with the automatic shift lever and the manual shift lever. The automatic shift lever may include an insertion groove inwardly depressed in one surface of the automatic shift lever, and when the manual shift lever rotates to a predetermined angle or greater in the first direction, the connection portion may be inserted into the insertion groove.

When the connection portion is inserted into the insertion groove, the manual shift lever and the automatic shift lever may be rotatable together. When the manual shift lever and the automatic shift lever rotate together to a predetermined angle in the first direction, the manual shift lever and the automatic shift lever may be configured to receive a shift-down (−) command, and when the manual shift lever and the automatic shift lever rotate together to a predetermined angle in a second direction that is opposite to the first direction, the manual shift lever and the automatic shift lever may be configured to receive a shift-up (+) command.

When the manual transmission lever rotates to a predetermined angle or greater in a second direction that is opposite to the first direction when the connection portion is inserted into the insertion groove, the connection portion may escape from the insertion groove. Additionally, the insertion groove may include a guide portion sloped at both edges of the insertion groove, and the guide portion may guide the connection portion to be inserted into the insertion groove or to escape from the insertion groove. The connection portion may be disposed vertically with respect to each of the automatic shift lever and the manual shift lever. The automatic shift lever and the manual shift lever may be disposed side by side.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
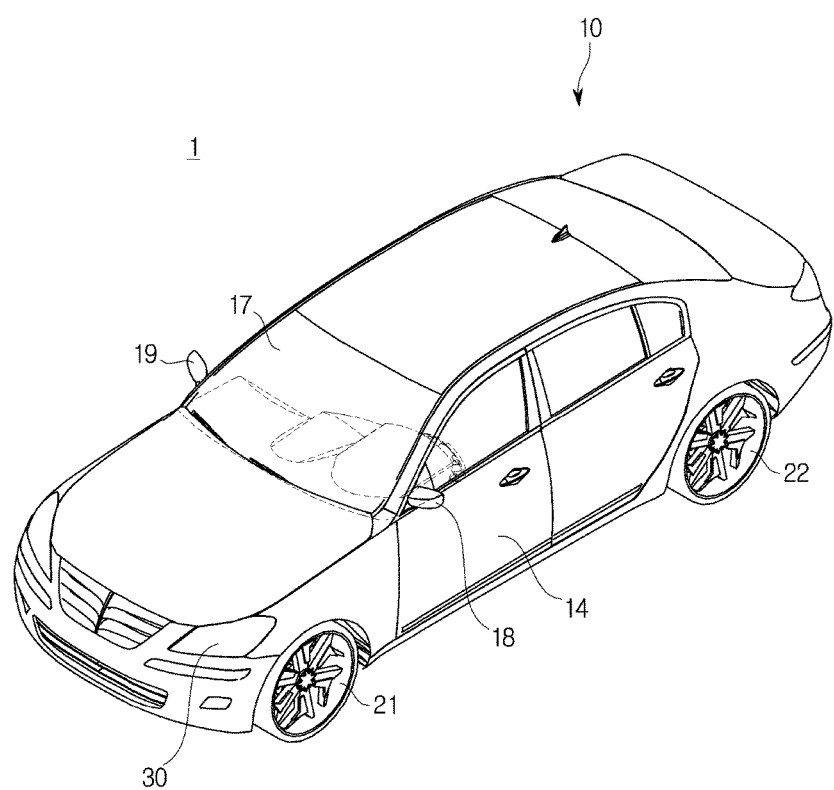
FIG. 1 shows an outer appearance of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Configurations illustrated in the exemplary embodiments and the drawings described in the present specification are only the exemplary embodiments of the present disclosure, and thus it is to be understood that various modified examples, which may replace the exemplary embodiments and the drawings described in the present specification, are possible when filing the present application. Also, like reference numerals or symbols denoted in the drawings of the present specification indicate elements or components that perform the substantially same functions. Also, the terms used in the present specification are for describing embodiments and not for limiting and/or restricting the present disclosure.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Meanwhile, in the following description, the terms "front direction", "rear direction", "upper portion", "lower portion", etc. are defined based on the drawings, and do not intend to limit shapes and locations of individual components. In the following description, a vehicle includes various types of mechanic equipment capable of transporting humans, goods, or animals from a departure point to a destination. For example, the vehicle may be an automobile to travel on roads or rails, a ship to travel by sea or river, or a plane to fly in the sky using the action of air. Also, a vehicle traveling on a road or rails moves in a predetermined direction by rotating at least one wheel. The vehicle may include a three- or four-wheeled vehicle, construction machinery, a two-wheeled vehicle, a prime mover bicycle, a bicycle, and a train travelling along rails.

Hereinafter, the exemplary embodiments of the present disclosure will be described in detail with reference to the accompanying drawings. FIG. 1 shows an outer appearance of a vehicle according to an exemplary embodiment of the present disclosure.

As shown in FIG. 1, a vehicle 1 according to an exemplary embodiment of the present disclosure may include a main body 10 that forms the outer appearance of the vehicle 1, a plurality of wheels 21 and 22 to move the vehicle 1, a plurality of doors 14 to shield the interior of the vehicle 1 from the outside, a front glass 17 to provide a driver inside the vehicle 1 with a front view of the vehicle 1, and a plurality of side-view mirrors 18 and 19 to provide the driver with rear views of the vehicle 1.

The wheels 21 and 22 may include front wheels 21 disposed in the front portion of the vehicle 1, and rear wheels 22 disposed in the rear portion of the vehicle 1. The front wheels 21 and the rear wheels 22 receive a rotational force from a driving apparatus that will be described later, to move the main body 10 forward or backward. The doors 14 may be rotatably disposed to the left and right of the main body 10 to allow the driver to open one of the doors and enter the vehicle 1. The doors 14 may shield the interior of the vehicle 1 from the outside when closed.

The front glass 17 may be disposed in the upper, front portion of the main body 10 to allow the driver inside the vehicle 1 to acquire a front view of the vehicle 1. The front glass 17 is also referred to as a windshield glass. The side-view mirrors 18 and 19 may include a left side-view mirror 18 disposed to the left of the main body 10 and a right side-view mirror 19 disposed to the right of the main body 10 to allow the driver inside the vehicle 1 to acquire side and rear views of the vehicle 1. Additionally, the vehicle 1 may include a plurality of lamps 30 disposed on the front and/or rear portion to secure a clear view and inform a driving direction.

Figure 2:
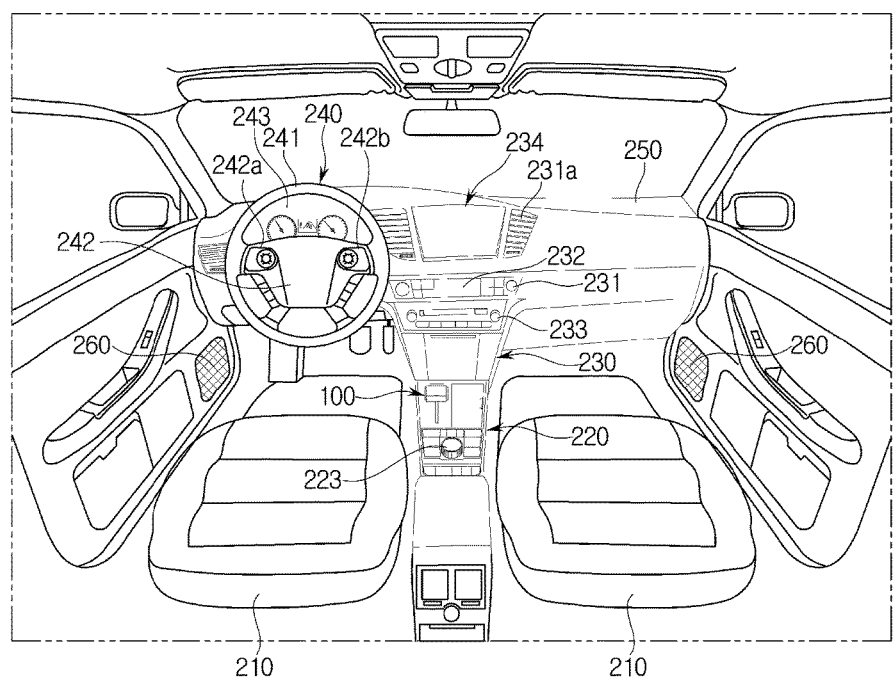
FIG. 2 shows an interior of a vehicle according to an exemplary embodiment of the present disclosure.

FIG. 2 shows an interior of a vehicle according to an exemplary embodiment of the present disclosure. As shown in FIG. 2, the vehicle 1 may include a plurality of seats 210 and a dashboard 250 in which a gear box 220, a center fascia 230, a steering wheel 240, etc. are installed.

A steering wheel 240, mounted on the dashboard 250 to change the driving direction of the vehicle 1, may include a rim 241 that is gripped by the driver, and a spoke 242 connected to a steering apparatus of the vehicle 1 and that connects the rim 241 to a hub of a rotation axis for steering. According to an exemplary embodiment, controllers 242a and 242b configured to operate various apparatuses (e.g., audio system) within the vehicle 1 may be mounted on the spoke 242. A cluster 243 may include a speed gauge to display speed of the vehicle 1, and a revolution per minute (RPM) gauge to display RPM of the vehicle 1. Accordingly, the driver is able check information regarding the vehicle 1 at a glance without fully diverting attention away from driving. The cluster 243 may be configured to display information regarding the vehicle 1, specifically, information regarding driving of the vehicle 1. For example, the cluster 243 may be configured to display a distance to empty (DTE) based on residual fuel, navigation information, audio information, etc.

For the driver to be able to check information regarding the vehicle 1 averting away from forward during driving, the cluster 243 may be disposed at an area facing the steering wheel 240 on the dashboard. Although not shown in the drawings, a head up display (HUD) may be mounted on the dashboard 250 to display visual information to be provided to the driver on the front glass 17. In the center fascia 230 installed in the dashboard 250, an air conditioner 231, a clock 232, audio system 233, a display 234, etc. may be installed.

The air conditioner 231 may be configured to adjust the temperature, humidity, air quality and flow of air inside the vehicle 1. The air conditioner 231 may include at least one vent 231a installed in the center fascia 230 to discharge air. In the center fascia 230, at least one button or dial for operating the air conditioner 231, etc. may be provided. A passenger such as a driver may use the button provided on the center fascia 230 to operate the air conditioner 231. The clock 232 may be disposed around the button or dial for operating the air conditioner 231.

The audio system 233 may include an operation panel on which a plurality of buttons for executing the functions of the audio system 233 are arranged. The audio system 233 may provide a radio mode and a media mode for reproducing audio files stored in various storage media. The audio system 233 may be configured to output an audio file as sound through a speaker 260. In FIG. 2, when the speaker 260 is disposed on the inner side of the doors 260 is shown, however, the speaker 260 may be disposed at any other location.

The display 234 may be configured display various types of information directly or indirectly related to the vehicle 1. For example, the display 234 may be configured to display direct information, such as navigation information of the vehicle 1 and state information of the vehicle 1, and indirect information, such as multimedia information including pictures and moving pictures received from the inside or outside of the vehicle 1. The display 234 may be a Liquid Crystal Display (LCD), a Light Emitting Diode (LED) display, a Plasma Display Panel (PDP) display, or an Organic Light Emitting Diode (OLED) display, although not limited to these. Additionally, in the gear box 220, a shift lever 100 for shifting of the vehicle 1, and a dial controller 223 configured to execute functions of the vehicle 1 may be disposed. Hereinafter, the vehicle 1 including the shift lever 100 in which a manual shift lever 120 is separated from an automatic shift lever 110 will be described in detail.

Figure 3:
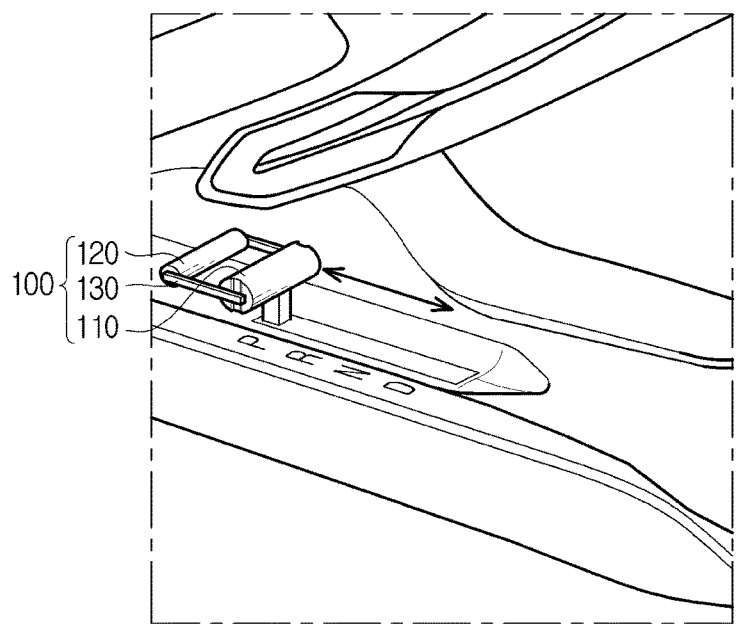
FIG. 3 shows a shift lever in a vehicle according to an exemplary embodiment of the present disclosure.
Figure 4:
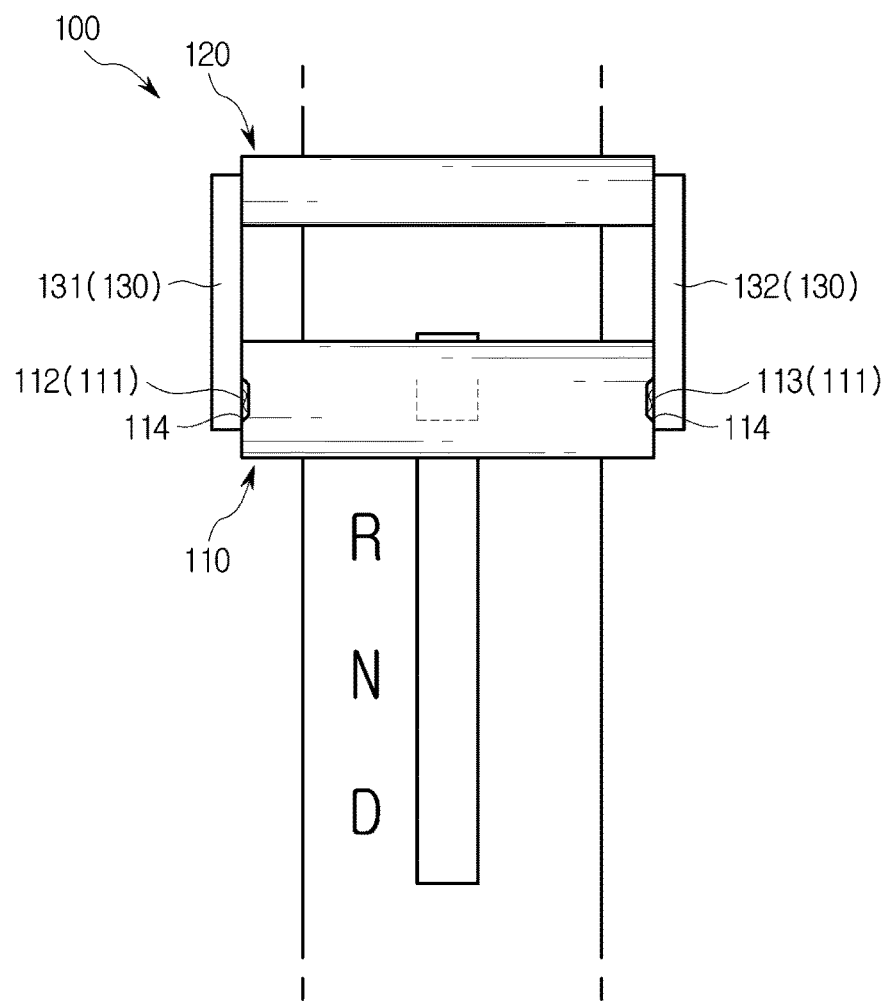
FIGS. 4 and 5 are views for describing operation of an automatic shift lever in a vehicle according to an exemplary embodiment of the present disclosure.
Figure 5:
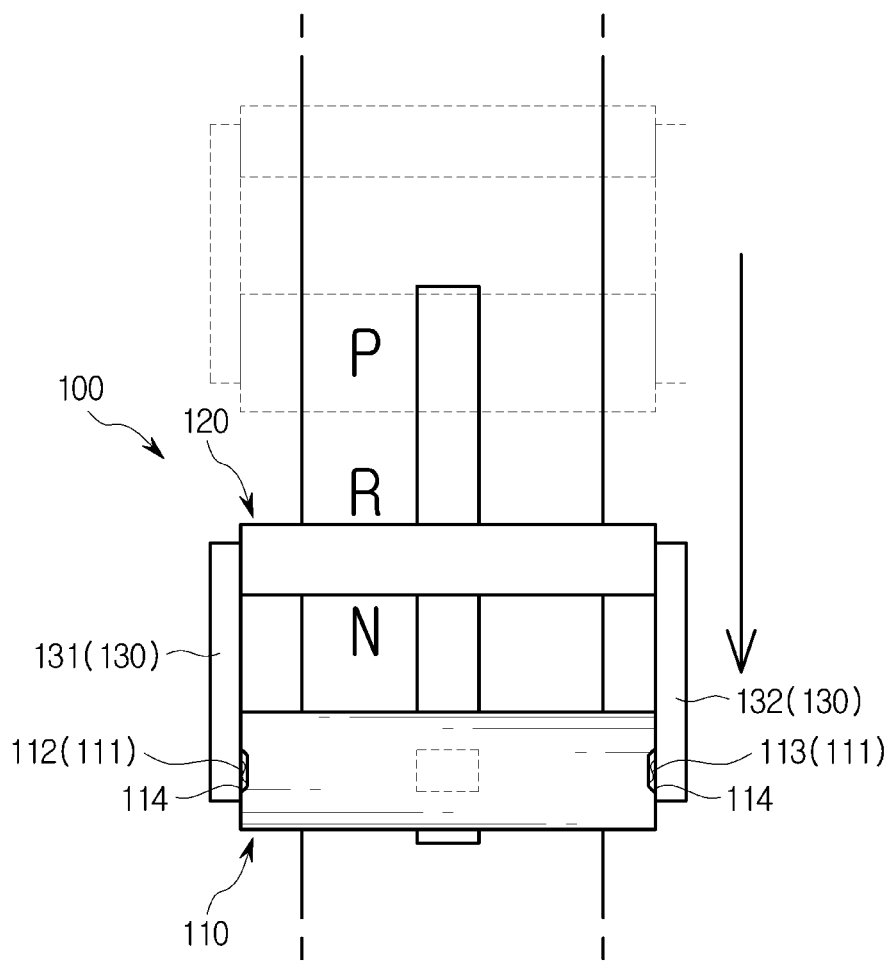

FIG. 3 shows a shift lever in a vehicle according to an exemplary embodiment of the present disclosure, and FIGS. 4 and 5 are views for describing operation of an automatic shift lever in a vehicle according to an exemplary embodiment of the present disclosure. The vehicle 1 according to an exemplary embodiment of the present disclosure may include the shift lever 100 configured to receive a shift command, and a transmission apparatus (not shown) configured to perform shifting based on a shift command received by the shift lever 100. The shift lever 100 may include the automatic shift lever 110 configured to receive an automatic shift command and the manual shift lever 120 configured to receive a manual shift command.

As shown in FIGS. 4 and 5, the automatic shift lever 110 may move linearly to receive an automatic shift command. According to an exemplary embodiment, the automatic shift lever 110 may be configured to move forward or backward. Alternatively, the automatic shift lever 110 may be configured to move from side to side. The automatic shift lever 110 may be positioned at any one of a plurality of shift stages. The plurality of shift stages may be P, R, N, and D stages. The plurality of shift stages may include some of the P, R, N, and D stages, or further include another shift stage. For example, the P stage may be provided as a separate button, and the automatic shift lever 110 may be positioned at any one of the R, N, and D stages, but the present disclosure is not limited thereto.

Figure 6:
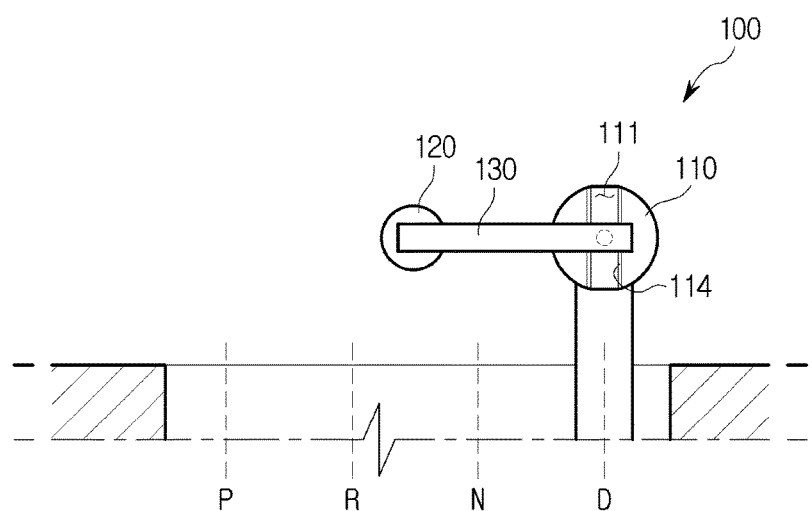
FIGS. 6 and 7 are views for describing operation of changing an automatic shift mode to a manual shift mode, in a vehicle according to an exemplary embodiment of the present disclosure.
Figure 7:
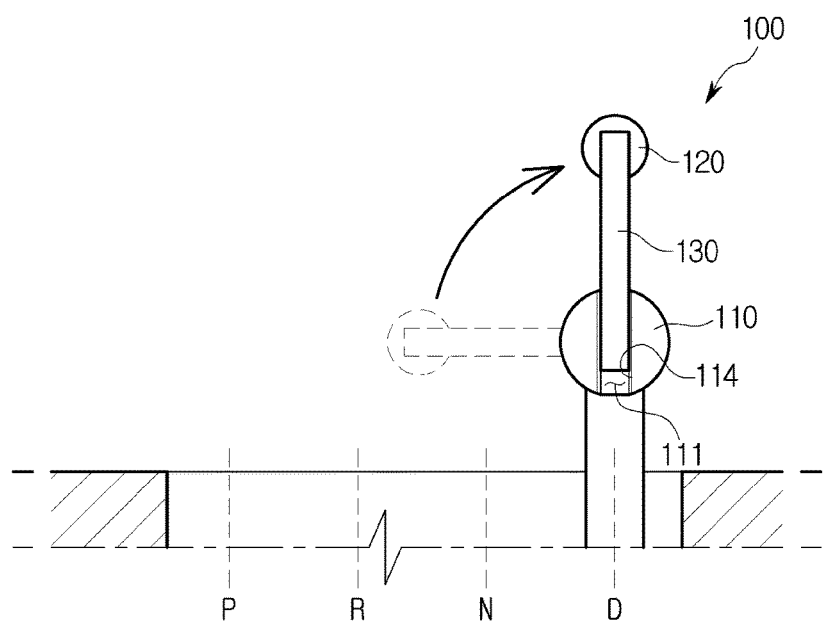

FIGS. 6 and 7 are views illustrating operation of changing an automatic shift mode to a manual shift mode, in a vehicle according to an exemplary embodiment of the present disclosure. As shown in FIGS. 6 and 7, the manual shift lever 120 may be rotatable. More specifically, the manual shift lever 120 may be configured to rotate on the automatic shift lever 110 as an axis of rotation. The manual shift lever 120 may rotate on the automatic shift lever 110 as an axis of rotation to move upward from the automatic shift lever 110. In other words, the manual shift lever 120 may be configured to move over the automatic shift lever 110. When the manual shift lever 120 moves over the automatic shift lever 110, the transmission apparatus may change the automatic shift mode to the manual shift mode.

Figure 8:
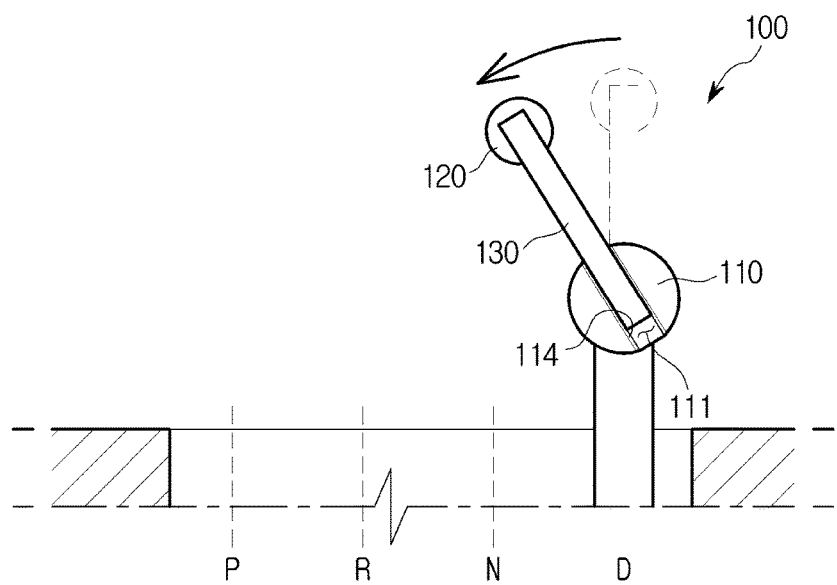
FIGS. 8 and 9 are views for describing operation of a manual shift lever in a vehicle according to an exemplary embodiment of the present disclosure.
Figure 9:
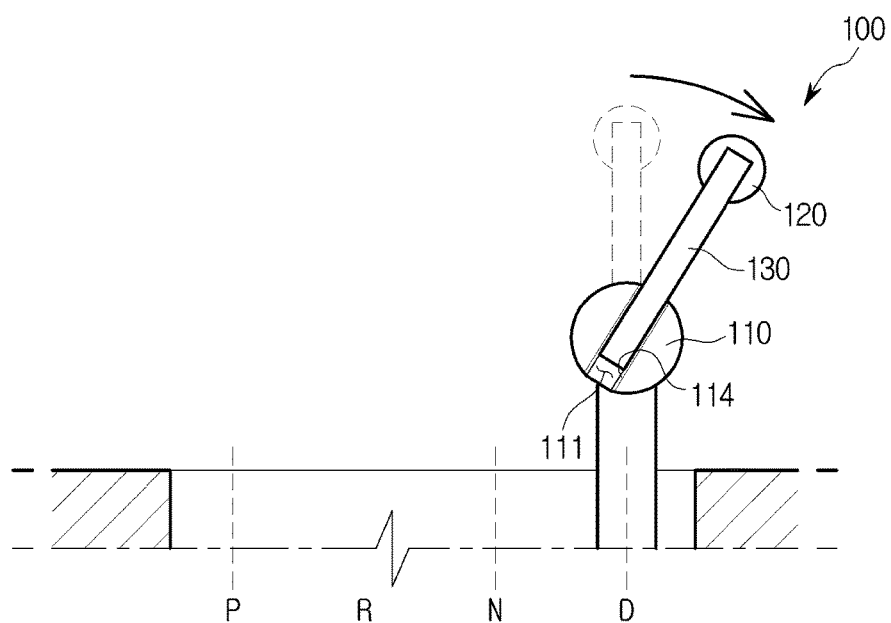

FIGS. 8 and 9 are views illustrating operation of a manual shift lever in a vehicle according to an exemplary embodiment of the present disclosure. When the manual shift lever 120 moves over the automatic shift lever 110, the manual shift lever 120 may be rotatable together with the automatic shift lever 110. When the manual shift lever 120 rotates, the automatic shift lever 110 may be configured to rotate together with the manual shift lever 120. When the manual shift lever 120 and the automatic shift lever 110 rotate together, shift operation of shift-up (+) or shift-down (−) is possible. More specifically, a shift-up (+) command or a shift-down (−) command may be transferred to the transmission apparatus based on a rotation direction of the manual shift lever 120 and the automatic shift lever 110. The transmission apparatus may perform shifting based on the received shift command.

The manual shift lever 120 may be allowed to rotate or be prevented or blocked from rotating, based on a shift stage at which the automatic shift lever 110 is positioned. When the automatic shift lever 110 is positioned at the D stage, the manual shift lever 120 may be allowed to rotate. In other words, the manual shift lever 120 may be allowed to rotate only when the automatic shift lever 110 is positioned at the D stage. When the automatic shift lever 110 is positioned at any one of the P, R, and N stages, the manual shift lever 120 may be prevented from rotating. Since the manual shift mode is operated using the manual shift lever 120 at the D stage, a user may mistake a current shift stage as the D stage when the current shift stage is not the D stage, when the manual shift lever 120 is rotatable at another shift stage than the D stage. Accordingly, to prevent the erroneous user error, the manual shift lever 120 may be allowed to rotate only at the D stage.

According to an exemplary embodiment of the present disclosure, the shift lever 100 may include a connection portion 130 that connects the automatic shift lever 110 to the manual shift lever 120. As shown in FIGS. 4 and 5, a pair of connection portions 130 may be provided. The connection portions 130 may include a first connection portion 131 and a second connection portion 132. The first connection portion 131 and the second connection portion 132 may be disposed side by side (e.g., next to each other). The connection portions 130 may be disposed vertically with respect to each of the automatic shift lever 110 and the manual shift lever 120. Since the automatic shift lever 110 may be connected to the manual shift lever 120 by the connection portions 130, the automatic shift lever 110 and the manual shift lever 120 may be disposed side by side.

The first connection portion 131 may connect one a first of the automatic shift lever 110 to a first end of the manual shift lever 120. The first connection portion 131 may be rotatably coupled with the first end of the automatic shift lever 110. In addition, the first connection portion 131 may be rotatably coupled with the first end of the manual shift lever 120. In other words, the first connection portion 131 may be rotatably coupled with the first ends of the automatic shift lever 110 and the manual shift lever 120. The second connection portion 132 may connect a second end of the automatic shift lever 110 to a second end of the manual shift lever 120. The second connection portion 132 may be rotatably coupled with the second end of the automatic shift lever 110. In addition, the second connection portion 132 may be rotatably coupled with the second end of the manual shift lever 120. In other words, the second connection portion 132 may be rotatably coupled with the second ends of the automatic shift lever 110 and the manual shift lever 120.

The automatic shift lever 110 may include an insertion groove 111 into which the connection portion 130 may be inserted. The insertion groove 111 may be formed in both ends of the automatic shift lever 110. The insertion groove 111 may include a first insertion groove 112 and a second insertion groove 113. The first insertion groove 112 may be formed in a first end of the automatic shift lever 110. In other words, the first insertion groove 112 may be formed in one side surface (e.g., a first side surface) of the automatic shift lever 110. The insertion groove 111 may have a shape that corresponds to the first connection portion 131. The first insertion groove 112 may be inwardly depressed from one side surface of the automatic shift lever 110. The second insertion groove 113 may be formed in the second end of the automatic shift lever 110. In other words, the second insertion groove 113 may be formed in the other side surface (e.g., the second side surface) of the automatic shift lever 110. The second insertion groove 111 may have a shape that corresponds to the second connection portion 132. The second insertion groove 113 may be inwardly depressed from the other side surface of the automatic shift lever 110.

The insertion groove 111 may include a guide portion 114. The guide portion 114 may be sloped at both edges of the insertion groove 111. The guide portion 114 may guide the connection portion 130 to be inserted into the insertion groove 111. In addition, the guide portion 114 may guide the connection portion 130 to escape from the insertion groove 111. The connection portion 130 may be smoothly inserted into the insertion groove 111 along the sloped guide portion 114. Similarly, the connection portion 130 may be smoothly withdrawn (e.g., slid out from) from the insertion groove 111 along the guide portion 114.

As described above, when the manual shift lever 120 moves over the automatic shift lever 110, the manual shift lever 120 may be allowed to rotate together with the automatic shift lever 110. In terminology of the manual shift lever 120 moving over the automatic shift lever 110 is clearly illustrated in the drawings. In other words, the manual shift lever 120 is disposed above the automatic shift lever 110 when it has been moved. More specifically, when the connection portion 130 is inserted into the insertion groove 111, the manual shift lever 120 is capable of rotating together with the automatic shift lever 110 within a predetermined angle range. When the manual shift lever 120 rotates together with the automatic shift lever 110 to a predetermined angle or greater although the connection portion 130 is inserted into the insertion groove 111, the connection portion 130 may escape from the insertion groove 111. When the connection portion 130 escapes from the insertion groove 111, the manual shift lever 120 and the automatic shift lever 110 may not rotate together.

Figure 10:
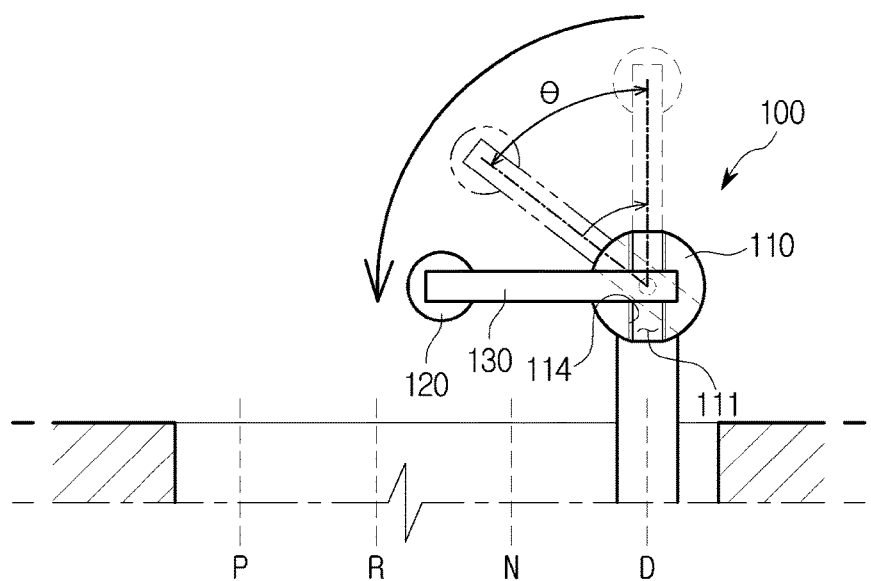
FIG. 10 is a view for describing operation of changing a manual shift mode to an automatic shift mode, in a vehicle according to an exemplary embodiment of the present disclosure.

Hereinafter, a process of changing the automatic shift mode to the manual shift mode and a process of performing shifting in the manual shift mode, when the automatic shift lever 110 is positioned at the D stage, will be described. FIGS. 6 and 7 are views illustrating operation of changing the automatic shift mode to the manual shift mode, in the vehicle according to an exemplary embodiment of the present disclosure, and FIG. 10 is a view illustrating operation of changing a manual shift mode to an automatic shift mode, in a vehicle according to an exemplary embodiment of the present disclosure.

When the manual shift lever 120 is rotatable, that is, when the automatic shift lever 110 is positioned at the D stage, the manual shift lever 120 may be configured to rotate in a first direction on the automatic shift lever 110 as an axis of rotation. When the manual shift lever 120 rotates in the first direction to a predetermined angle or greater, the connection portion 130 may be inserted into the insertion groove 111. When the connection portion 130 is inserted into the insertion groove 111, the automatic shift mode may change to the manual shift mode.

When the connection portion 130 is inserted into the insertion groove 111 to allow the automatic shift mode to change to the manual shift mode, the manual shift lever 120 and the automatic shift lever 110 may rotate together. When the manual shift lever 120 and the automatic shift lever 110 rotate in the first direction to a predetermined angle, a shift-down (−) command may be received. The transmission apparatus may perform shift-down (−) in the manual shift mode according to the shift-down (−) command. When the manual shift lever 120 and the automatic shift lever 110 rotate in a second direction that is opposite to the first direction, a shift-up (+) command may be received. The transmission apparatus may perform shift-up (+) in the manual shift mode according to the shift-up (+) command.

When a change in the manual shift mode to the automatic shift mode is required or requested, the manual shift lever 120 may be rotated in the second direction to a predetermined angle or greater. As shown in the drawings, when the manual shift lever 120 rotates to a predetermined angle θ or greater, the connection portion 130 may be withdrawn (unintentionally) from the insertion groove 111. When the connection portion 130 escapes from the insertion groove 111, the manual shift mode may change to the automatic shift mode.

As described above, the vehicle according to the technical concept of the present disclosure may separate the manual shift lever from the automatic shift lever. A user may move the automatic shift lever in a straight line to select any one of the P, R, N, and D shift stages. When the automatic shift lever is positioned at the D stage, the user may rotate the manual shift lever to change to the manual shift mode. After changing to the manual shift mode, the user may rotate the manual shift lever to perform shift-up (+) or shift-down (−) operation. Accordingly, manual shifting may be distinguished from automatic shifting, thereby preventing an erroneous user operation.

According to a technical concept of the present disclosure, there is provided the vehicle including the transmission apparatus of separating the manual shift lever from the automatic shift lever to distinguish manual shifting from automatic shifting, thereby preventing an erroneous user operation. According to another technical concept of the present disclosure, there is provided the vehicle including the transmission apparatus of performing automatic shifting by slide operation and performing manual shifting by rotation operation to distinguish manual shifting from automatic shifting, thereby preventing an erroneous user operation.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A vehicle, comprising:
   a shift lever configured to receive a shift command; and
   a transmission apparatus configured to perform shifting based on the shift command received by the shift lever,
   wherein the shift lever comprises:
      an automatic shift lever configured to move linearly to receive an automatic shift command;
      a manual shift lever configured to rotate on the automatic shift lever as an axis of rotation to receive a manual shift command; and
      a connection portion that connects the automatic shift lever to the manual shift lever, and the connection portion is rotatably coupled with the automatic shift lever and the manual shift lever.

2. The vehicle according to claim 1, wherein the automatic shift lever is positioned at any one shift stage of a park (P), a reverse (R), a neutral (N), and a drive (D) shift stage and is configured to receive the automatic shift command based on a position of the automatic shift lever.

3. The vehicle according to claim 1, wherein the manual shift lever is rotatable in a first direction or in a second direction that is opposite to the first direction.

4. The vehicle according to claim 3, wherein when the manual shift lever rotates to a predetermined angle in the first direction, the manual shift lever receives a shift-down (−) command, and when the manual shift lever rotates to a predetermined angle in the second direction, the manual shift lever receives a shift-up (+) command.

5. The vehicle according to claim 2, wherein when the automatic shift lever is positioned at the D shift stage, the manual shift lever is allowed to rotate, and when the automatic shift lever is positioned at any one shift stage of the P, R, and N shift stages, the manual shift lever is prevented from rotating.

6. The vehicle according to claim 1, wherein the automatic shift lever includes an insertion groove inwardly depressed in one surface of the automatic shift lever, and when the manual shift lever rotates to a predetermined angle or greater in the first direction, the connection portion is inserted into the insertion groove.

7. The vehicle according to claim 6, wherein when the connection portion is inserted into the insertion groove, the manual shift lever and the automatic shift lever are rotatable together.

8. The vehicle according to claim 7, wherein when the manual shift lever and the automatic shift lever rotate together to a predetermined angle in the first direction, the manual shift lever and the automatic shift lever receive a shift-down (−) command, and when the manual shift lever and the automatic shift lever rotate together to a predetermined angle in a second direction that is opposite to the first direction, the manual shift lever and the automatic shift lever receive a shift-up (+) command.

9. The vehicle according to claim 6, wherein when the manual transmission lever rotates to a predetermined angle or greater in a second direction that is opposite to the first direction when the connection portion is inserted into the insertion groove, the connection portion is slide out of the insertion groove.

10. The vehicle according to claim 9, wherein the insertion groove includes a guide portion sloped at both edges of the insertion groove, and the guide portion guides the connection portion to be inserted into the insertion groove or to slide out from the insertion groove.

11. The vehicle according to claim 1, wherein the connection portion is disposed vertically with respect to each of the automatic shift lever and the manual shift lever.

12. The vehicle according to claim 1, wherein the automatic shift lever and the manual shift lever are disposed side by side.

* * * * *